2,937,123

SELECTED SULFUR FLUORIDES AND ELECTROLYTIC PROCESS FOR MAKING THE SAME

Earl L. Muetterties, Chadds Ford, Pa., assignor to E. I. du Pont de Nemours and Company, Wilmington, Del., a corporation of Delaware No Drawing. Application April 26, 1956
Serial No. 580,723

3 Claims. (Cl. 204—59)

This invention relates to a new method of preparing sulfur hexafluoride and other fluorides of hexavalent sulfur.

Sulfur hexafluoride is a valuable insulating agent for high voltage electrical equipment. It is also useful as a source of valuable fluorocarbons such as carbon tetrafluoride and tetrafluoroethylene through its reaction with carbon at high temperatures (U.S. Patent 2,709,186). Sulfur hexafluoride has been prepared in various ways. In one method, that of U.S. Patent 2,717,235, a mixture of anhydrous hydrogen fluoride with a covalent sulfur compound such as hydrogen sulfide, carbon disulfide, or sulfur monochloride is electrolyzed at a voltage of 5–6 volts.

This invention has, as an object, provision of a new process for the preparation of sulfur hexafluoride. Other objects will appear hereinafter.

These objects are accomplished by the process of this invention which comprises electrolyzing, at a current potential of at least 6 volts, a mixture of sulfur dichloride and hydrogen fluoride, and separating the hexavalent sulfur fluorides present in the reaction product.

Sulfur dichloride is an essential reactant in the process of the present invention. Even as closely related a compound as sulfur monochloride ($S_2Cl_2$) is of no practical utility in the electrolytic synthesis of sulfur hexafluorides, even though its conductivity is about the same as that of sulfur dichloride. This is for the reason that even with the use of an alkali metal fluoride or other conductivity-promoting solute, only a low intensity current can be passed through a cell using sulfur monochloride, and to do this requires high potentials. Thus, when using $S_2Cl_2$/HF mixtures in the cell of Example I below, it was possible to put a maximum of only 3–4 amperes of current through the cell when using $S_2Cl_2$/HF/KF mixtures, and that by going up to 60–80 volts. This means that, using sulfur monochloride, production of sulfur hexafluoride is impractically slow, since it takes six faradays to form one grammole of $SF_6$. Moreover, current efficiencies are much lower at the very high voltages required for any current throughput with $S_2Cl_2$/HF mixtures.

The process of the present invention is remarkable in that it can be, and preferably is, carried out at voltages above those sufficient to generate free fluorine from hydrogen fluoride. The theoretical voltage required to obtain fluorine from HF is 2.77 volts. Since, however, the electrode processes are far from reversible, a potential in the neighborhood of 8 volts is needed (see Simons, "Fluorine Chemistry," vol. I, p. 295). Electrofluorination is always carried out at less than 6–8 volts since higher voltages give fluorine which reacts explosively with any organic compound present or with the hydrogen formed during the electrolysis. However, in the process of this invention it has been found that voltages as high as 30–40 volts, and desirably in the range of 6–20 volts, can be used without any cell explosions or other indications that fluorine and/or hydrogen are formed.

The sulfur dichloride used in the examples which follow was prepared by reacting chlorine and sulfur in a 1.4:1 molar ratio at 60° C. for one hour under autogenous pressure in a corrosion-resistant bomb, followed by heating at 30° C. for 24 hours. The product can be distilled, preferably under reduced pressure, or it can be used as such, in which case it contains some chlorine. However, the presence of chlorine among the reactants in the electrolytic cell is not detrimental. On the contrary, it is advantageous, since it has been found that, when chlorine is present, a lower voltage is needed for the same current throughput (e.g., 12 volts rather than 16–20 in the absence of chlorine to pass 12 amperes through the cell). Moreover, the presence of chlorine appears to favor the production of hexavalent sulfur chlorofluorides, when these products are desired.

The other reactant, hydrogen fluoride, can be the commercial so-called anhydrous product, which contains traces of water, and usually small amounts (0.1–0.5%) of sulfur dioxide. A small amount of a solute serving to improve the conductivity of the mixture, preferably an anhydrous alkali metal fluoride, e.g., potassium fluoride or sodium fluoride, is added to the electrolyte.

The reactants are preferably used in proportions in the range of about 5 to about 10 moles of hydrogen fluoride per mole of sulfur dichloride, although such ratios are by no means essential. The amount of conductivity-improving solute need not be higher than 1% by weight of the total electrolytic mixture, and can be as low as 0.1%. When chlorine is used as an added reactant, it is desirably present whether in crude, chlorine-containing sulfur dichloride or as added chlorine in amounts between 0.1 and 0.5 mole per mole of sulfur dichloride.

Any suitably designed electrolytic cell can be used, for example that described in Prober U.S. 2,717,235 or that described by Clifford et al. at J. Chem. Soc. (1953), p. 2373. The cells used in the examples which follow consisted of a cylindrical nickel vessel, which served as the cathode. This vessel was fitted with a polytetrafluoroethylene threaded top, which had a gas inlet tube and which supported at its center a nickel cylinder serving as the anode. The cell used in Example I was 3 inches in diameter and 3 inches deep, with the anode ¾ inch in diameter and 2½ inches long. The cell used in the other examples was 4 inches in diameter and 2¾ inches deep, with the anode 2¼ inches long and one inch in diameter. In operation, the cell was connected, thru an outlet pipe thru the polytetrafluoroethylene top, to a stainless steel condenser though which circulated a liquid cooled to 0° C. or lower to condense the hydrogen fluoride vapors. Following this condenser, the effluent gas passed through a tower of sodium fluoride pellets to remove the last traces of hydrogen fluoride, and the effluent was then condensed in traps cooled in liquid nitrogen and stored in a pressure cylinder. In most cases, a slow stream of helium was passed into the top of the cell before and during cell operation. Other types of apparatus can be used. It is necessary, of course, that the electrodes be substantially insoluble in the electrolyte.

While some sulfur hexafluoride is produced at a cell voltage as low as 3 volts, it is much preferred to operate at a voltage of at least 6 volts. The voltage can be as high as 50 volts but the most desirable range of potential is that between 6 and 20 volts, under which conditions a direct current of about 5 to about 15 amperes can be passed through the cell.

The electrolyte temperature is preferably kept below the boiling point of hydrogen fluoride under the conditions of the electrolysis, although somewhat higher temperatures can be used with a cell designed to withstand superatmospheric pressures. Preferably the electrolysis is conducted at temperatures in the range of −5 to 20°

C. by circulating a coolant, at −30 to 0° C., around the outside of the cell.

In operation, the reaction products were collected by condensing the off-gas in the cold traps. After stopping, the cell was usually allowed to warm up to room temperature, and the remaining gaseous product was swept out with a stream of helium, the hydrogen fluoride being absorbed by the sodium fluoride in the scrubbing tower. The liquid remaining in the cell was shown by distillation to be mainly sulfur dichloride. Some sulfur monochloride was normally present at the end of the run.

The condensed reaction product was usually subjected to infrared and mass spectrographic analysis. It was thus shown that the principal reaction product was sulfur hexafluoride. This compound constituted as much as 60–80% of the total product, on a molar basis, after removing the hydrogen chloride present, and it was prepared at current efficiencies of 40–50%. Mass spectrography gave good evidence of the presence of new hexavalent sulfur chlorofluorides, viz., sulfur chloropentafluoride, $SF_5Cl$, sulfur dichlorotetrafluoride, $SF_4Cl_2$, and sulfur trichlorotrifluoride, $SF_3Cl_3$. Another new compound, sulfur monohydropentafluoride, $SF_5H$, was also detected through mass spectrography. These new fluorides of hexavalent sulfur are present in the reaction product in small amounts, but they are concentrated by distillation of the product through an efficient low temperature fractionating column.

The principal by-products were sulfur-oxygen compounds, including thionyl fluoride, sulfuryl fluoride and sulfur dioxide. Other products present in small amounts were thionyl chloride and sulfuryl chloride, together with their mixed chlorofluorides, sulfur tetrafluoride ($SF_4$), sulfur tetrafluoride oxide ($SOF_4$) and chlorine. Even in runs in which a large excess of chlorine was present, the gaseous product did not contain much chlorine. The sulfoxy compounds probably resulted from the inadvertent introduction of water and/or air into the cell. In some cases, the condensate contained appreciable amounts of hydrogen chloride. This could be removed prior to analysis by storing the gas for 24 hours or more at room temperature in a cylinder containing sodium fluoride in amount at least sufficient to absorb the hydrogen chloride in accordance with the equation $HCl + 2NaF \rightarrow NaCl + NAF.HF$.

The principal and most important product of this process, sulfur hexafluoride, can be isolated from the reaction product by fractionation in a low temperature still. Even more conveniently, sulfur hexafluoride of sufficient purity for practically all purposes can be isolated simply by passing the crude gaseous reaction product through an aqeous alkaline solution, which decomposes and absorbs substantially all the other compounds present but leaves $SF_6$ unaffected.

The following examples illustrate the process of this invention. In all cases, the electrolytic cell used was of the type described above. Whenever the composition of the reaction product was determined either by infrared spectroscopy or mass spectroscopy, analyses were made on both the gaseous and the liquid portions present in the cylinder containing the condensed reaction product. This was done by taking samples from the cylinder in the upright position (gas) and in the inverted position (liquid). The values shown for each component are averages of these two determinations. Distillation of a sample so analyzed and weighing the materials so separated showed that this averaging of values gave reliable results.

*Example I*

A mixture of 122 g. of sulfur dichloride, 168 g. of commercial anhydrous hydrogen fluoride and 1 g. of potassium fluoride was electrolyzed at .7 volts and 6 amperes for 1.33 hours, the coolant circulating around the cell being maintained at −5 to 0° C. There was obtained 5.3 g. of reaction product which was shown by mass spectroscopy to contain, in mole percent, 45% sulfur hexafluoride, 2% sulfur tetrafluoride, 8% thionyl fluoride, 2% silicon tetrafluoride, 1% carbon dioxide and small amounts of sulfur chlorofluorides. Hydrogen chloride and some hydrogen fluoride were also present. The yield of sulfur hexafluoride, based on current efficiency, was about 36%.

The crude products from three similar runs, amounting to 52.8 g., were combined and distilled through a low temperature Podbielniak column. A high boiling liquid, e.g., a commercially available fluorinated cyclic ether of boiling point above 100° C., was added to serve as a "chaser" and help remove the more volatile fractions. After most of the sulfur hexafluoride had been distilled, fractions were obtained boiling at (a) −63° to −40° C.; (b) 40–48° C. and (c) 48–88° C. All of these fractions were found by mass spectrography to contain, in amounts up to about 2 mole percent, sulfur dichlorotetrafluoride [highest in fraction (a)] and sulfur trichlorotrifluoride [highest in fraction (b)]. Sulfur monohydropentafluoride, $SF_5H$, was also detected in fraction (a). Other components, besides sulfur hexafluoride, hydrogen chloride and hydrogen fluoride, included in minor amounts hexafluoroethane, sulfuryl chloride, sulfuryl fluoride, sulfur tetrafluoride, sulfur tetrafluoride oxide ($SOF_4$), thionyl chloride, thionyl fluoride, phosgene, silicon tetrafluoride, sulfur dioxide, carbon dioxide and chlorine.

*Example II*

A mixture of 232 g. of sulfur dichloride, 255 g. of commercial anhydrous hydrogen fluoride and 5 g. of potassium fluoride was electrolyzed at a voltage varying between 18 and 47 volts (35–47 volts for 1.2 hours during initial part of run, 18–22 volts for the remainder of the run), and at a current of 11.9 amperes for 3.6 hours. The cell coolant temperature was −8 to −12° C. The crude product (80 g.) was maintained in contact with 80 g. of sodium fluoride at room temperature for 24 hours to absorb any hydrogen chloride present, and the residual gas (39 g. after this operation) was transferred to another cylinder. This product was found by mass spectroscopy to contain, on a molar basis, 33% sulfur hexafluoride, 24% thionyl fluoride, 4% sulfur dioxide and 2% carbon dioxide. The yield of sulfur hexafluoride based on current efficiency was 55%.

The crude products from several electrolyses, amounting to 130 g., were composited and distilled through a low temperature Podbielniak column. Prior to distillation, this product had an average sulfur hexafluoride content of about 41 mole percent. One passage through the column removed the sulfur dioxide and much of the thionyl fluoride and sulfuryl fluoride. The distillate (54 g.) was shown by infrared analysis to contain, on a molar basis, 80% $SF_6$, 15% $SOF_2$ and 5% $SO_2F_2$. On a weight basis, the product contained 87% sulfur hexafluoride. It is directly usable as a dielectric but is purified by a further distillation.

*Example III*

A mixture of 235 g. of sulfur dichloride, 272 g. of commercial anhydrous hydrogen fluoride and 5 g. of potassium fluoride was electrolyzed at 16–20 volts and 12 amperes for 3.8 hours, the cell coolant being at −18 to −22° C. The product (20 g. after treatment with sodium fluoride as in Example II) was shown by both infrared and mass spectroscopy to contain over 80 mole percent of sulfur hexafluoride. The yield of sulfur hexafluoride based on current efficiency was 41%.

In contrast with the foregoing examples, when a mixture of 202 g. of redistilled sulfur monochloride, $S_2Cl_2$, 296 g. of hydrogen fluoride and 5 g. of potassium fluoride was electrolyzed in the same cell, it was found impossible to pass a current of more than 3.3 amperes through the cell, and it was necessary to use a voltage of 60–80 volts to do this. After 3.75 hours' operation, the cell coolant being at −4 to −10° C., there was obtained only 5 g. of crude product which, after treatment with sodium fluoride as in Example II, gave 3 g. of residual material. This product was found by infrared analysis to contain only 10 mole percent of sulfur hexafluoride. Most of it (85 mole percent) was thionyl fluoride, and sulfuryl fluoride and carbon dioxide were also present. The yield in sulfur hexafluoride, based on current efficiency, was only 4.3%.

*Example IV*

This example illustrates the use of chlorine in the electrolyte.

A mixture of 198 g. of sulfur dichloride, 296 g. of commercial anhydrous hydrogen fluoride, 25 g. of chlorine and 5 g. of potassium fluoride was electrolyzed at 12 volts and 12.3 amperes. The voltage necessary to pass this current through the cell was less than it was in the absence of chlorine. The cell coolant was kept at −13 to −22° C. After 3.5 hours, there was collected 70 g. of crude reaction product from which, after treatment with sodium fluoride as in Example II, 48 g. of residual material was obtained. Mass spectroscopy showed that this product contained, on a molar basis, 37% sulfur hexafluoride, 22% thionyl fluoride, 1% sulfur dioxide, 1% carbon dioxide and small amounts of sulfur chloropentafluoride, $SF_5Cl$ and sulfur dichlorotetrafluoride, $SF_4Cl_2$. Chlorine and hydrogen chloride were also present. The yield of sulfur hexafluoride was about 55%, based on current efficiency.

The use of chlorine in the electrolysis of sulfur monochloride in hydrogen fluoride containing potassium fluoride led to a slight improvement, probably because some sulfur dichloride was formed in accordance with the equation $S_2Cl_2+Cl_2\rightarrow 2SCl_2$. However, even then the procedure was impractical since a current of less than 3 amperes could be passed through the cell at 15–30 volts, and the yield based on current efficiency was only 18%.

The foregoing detailed description has been given for clearness of understanding only, and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. The process for the preparation of sulfur hexafluoride in an electrolytic cell with an insoluble anode which comprises passing direct current at a voltage of at least 6 volts through an electrolyte consisting essentially of sulfur dichloride, hydrogen fluoride and a conductivity-promoting solute, carrying away reaction products comprising a mixture of sulfur hexafluoride, sulfur chlorofluorides and sulfur hydrofluorides, wherein the sulfur has a valence of six, and isolating sulfur hexafluoride therefrom.

2. The process of claim 1 wherein the electrolyte is electrolyzed at a voltage of 6–20 volts.

3. The process for the preparation of a mixture of sulfur hexafluoride, sulfur chlorofluorides and sulfur hydrofluorides wherein the sulfur has a valence of six in an electrolytic cell with an insoluble anode which comprises passing direct current at a voltage of at least 6 volts through an electrolyte consisting essentially of sulfur dichloride, hydrogen fluoride and a conductivity-promoting solute.

References Cited in the file of this patent
UNITED STATES PATENTS

| | | |
|---|---|---|
| 2,562,432 | McCann et al. | July 31, 1951 |
| 2,717,235 | Prober | Sept. 6, 1955 |
| 2,867,679 | Cobine | Jan. 6, 1959 |